United States Patent
Chen et al.

(10) Patent No.: US 8,237,397 B2
(45) Date of Patent: Aug. 7, 2012

(54) SOLAR ENERGY CONTROLLER

(75) Inventors: Yang-Yuan Chen, Taipei Hsien (TW); Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 443 days.

(21) Appl. No.: 12/493,151

(22) Filed: Jun. 26, 2009

(65) Prior Publication Data
US 2010/0295501 A1    Nov. 25, 2010

(30) Foreign Application Priority Data

May 19, 2009    (CN) .......................... 2009 1 0302434

(51) Int. Cl.
*H02J 7/00* (2006.01)
*H01M 10/44* (2006.01)
*H01L 35/00* (2006.01)

(52) U.S. Cl. ........ 320/101; 320/138; 320/139; 136/206; 323/906

(58) Field of Classification Search .................... 320/101
See application file for complete search history.

(56) References Cited

U.S. PATENT DOCUMENTS

| | | | | | |
|---|---|---|---|---|---|
| 4,794,272 | A | * | 12/1988 | Bavaro et al. | 307/66 |
| 5,923,100 | A | * | 7/1999 | Lukens et al. | 307/66 |
| 6,081,104 | A | * | 6/2000 | Kern | 323/268 |
| 2008/0084177 | A1 | * | 4/2008 | Sander et al. | 320/101 |

* cited by examiner

*Primary Examiner* — Yalkew Fantu
(74) *Attorney, Agent, or Firm* — Altis Law Group, Inc.

(57) ABSTRACT

A solar energy includes a charging control unit to output a number of charge voltages, a switch control unit, and a comparing unit. The switch control unit receives a break control signal and a charging control signal from the charging control unit to switch the charging control unit to charge the rechargeable battery, and receives a voltage detecting signal from the charging control unit to output a detect voltage corresponding to a charge voltage of the rechargeable battery. The comparing unit receives the detect voltage and correspondingly outputs a selecting signal to the charging control unit. The charging control unit determines the charge voltage of the rechargeable battery according to the selecting signal, and outputs a corresponding charge voltage to charge the rechargeable battery.

11 Claims, 2 Drawing Sheets

SOLAR ENERGY CONTROLLER

BACKGROUND

1. Technical Field

The present disclosure relates to a solar energy controller.

2. Description of Related Art

A rechargeable battery is charged from a solar energy operated absorption board controlled by a solar controller. Generally, an ordinary solar controller has a plurality of charging modes, correspondingly supply a plurality of charge voltages, such as 12 volts (V) charge voltage, 24 V charge voltage, 36 V charge voltage, and 48 V charge voltage, for example. Before charging a rechargeable battery, operators must determine which charge voltage matches with the rechargeable battery, and then set a corresponding charging mode of the solar controller to charge the rechargeable battery. However, sometimes the operators may set a wrong charging mode of the solar controller by mistake, which can damage the rechargeable battery.

DETAILED DESCRIPTION

Figure 1:
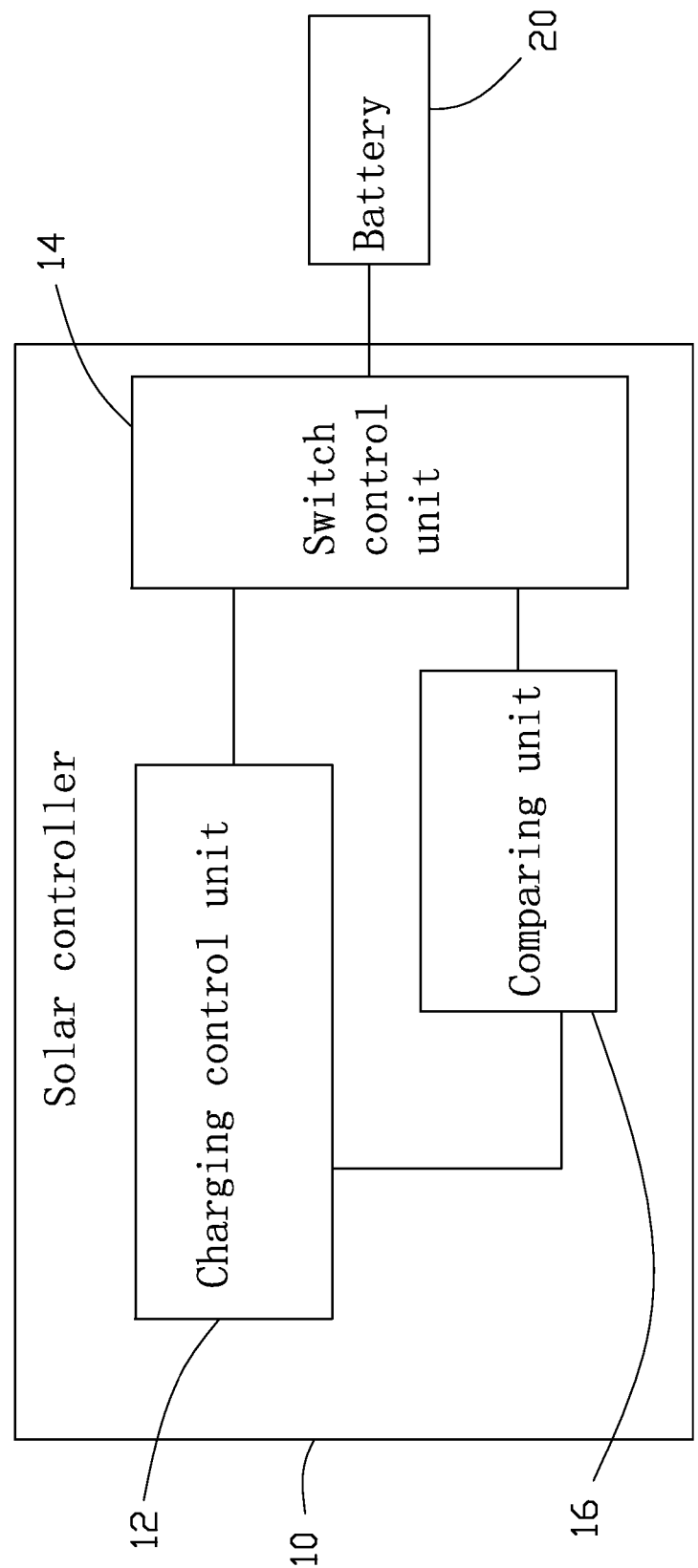
FIG. 1 is a block diagram of an exemplary embodiment of a solar energy controller, together with a rechargeable battery.
Figure 2:
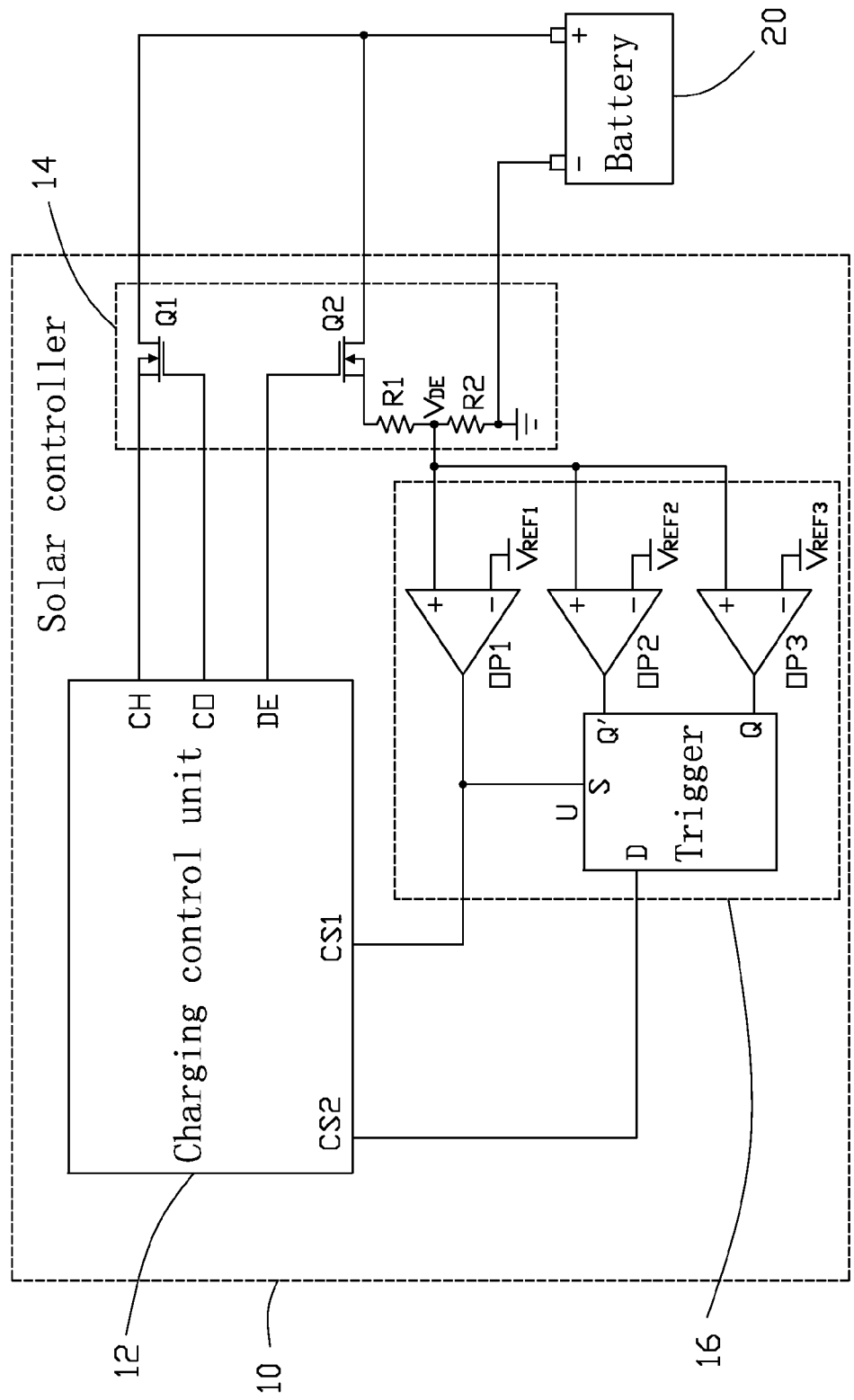
FIG. 2 is a circuit diagram of one embodiment of FIG. 1.

Referring to FIGS. 1 and 2, an exemplary embodiment of a solar energy controller 10 is used to charge a rechargeable battery 20. The solar energy controller 10 includes a charging control unit 12, a switch control unit 14, and a comparing unit 16.

The charging control unit 12 includes a charge pin CH, a charging control pin CO, a detect pin DE, a first selecting pin CS1, and a second selecting pin CS2.

The switch control unit 14 includes a first electrical switch, such as a field effect transistor (FET) Q1, a second electrical switch, such as a FET Q2, a first resistor R1, and a second resistor R2. A source of the FET Q1 is connected to the charge pin CH of the charging control unit 12. A gate of the FET Q1 is connected to the charging control pin CO. A drain of the FET Q1 is connected to a positive terminal of the rechargeable battery 20. A source of the FET Q2 is connected to ground via the first resistor R1 and the second resistor R2 in series. A gate of the FET Q2 is connected to the detecting pin DE of the charging control unit 12. A drain of the FET Q2 is connected to the positive terminal of the rechargeable battery 20. A negative terminal of the rechargeable battery 20 is grounded. In other embodiments, the FETs Q1 and Q2 can be replaced by other electrical switches, such as relays.

The comparing unit 16 includes a first comparator OP1, a second comparator OP2, a third comparator OP3, and a trigger U. Non-inverting terminals of the first to third comparators OP1-OP3 are connected to a node between the first resistor R1 and the second resistor R2, for receiving a detect voltage $V_{DE}$, where $V_{DE}=V_{BA}*R2/(R1+R2)$, and $V_{BA}$ is a charge voltage of the rechargeable battery 20. An inverting terminal of the first comparator OP1 is connected to a first reference voltage $V_{REF1}$. An inverting terminal of the second comparator OP2 is connected to a second reference voltage $V_{REF2}$. An inverting terminal of the third comparator OP3 is connected to a third reference voltage $V_{REF3}$. An output terminal of the first comparator OP1 is connected to the first selecting pin CS1 of the charging control unit 12 and a triggering pin S of the trigger U. An output terminal of the second comparator OP2 is connected to a first input pin Q' of the trigger U. An output terminal of the third comparator OP3 is connected to a second input pin Q of the trigger U. An output pin D of the trigger U is connected to the second selecting pin CS2 of the charging control unit 12.

In one embodiment, the charging control unit 12 includes four charging modes, to correspondingly supply four charge voltages, such as a 12 volts (V) charge voltage, a 24 V charge voltage, a 36 V charge voltage, and a 48 V charge voltage. In one embodiment, a relationship of the first to third reference voltages $V_{REF1}$-$V_{REF3}$ may be about: $V_{REF2}<V_{REF1}<V_{REF3}$, and $V_{REF1}=26\ V*R2/(R1+R2)$, $V_{REF2}=14\ V*R2/(R1+R2)$, $V_{REF3}=38\ V*R2/(R1+R2)$. In other words, 12 V<$[V_{REF2}*(R1+R2)/R2=14\ V]$<24 V<$[V_{REF1}*(R1+R2)/R2=26\ V]$<36 V<$[V_{REF3}*(R1+R2)/R2=38\ V]$<48 V. In other embodiments, the number of the charging modes of the charging control unit 12 and the voltage values supplied by the charging control unit 12 can be adjusted according to requirements. The number of the comparators and the voltage values of the reference voltages can be adjusted corresponding to the charging modes of the charging control unit 12 and the voltage values supplied by the charging control unit 12.

In use, the charging control unit 12 outputs a break control signal, such as a 0V low voltage signal, via the charging control pin CO to turn off the FET Q1. Therefore, the rechargeable battery 20 cannot be charged. The charging control unit 12 outputs a voltage detecting signal, such as a 5 V high voltage signal, via the detect pin DE to turn on the FET Q2. The switch control unit 14 outputs the detect voltage $V_{DE}$ of the node between the first resistor R1 and the second resistor R2. The comparing unit 16 detects the detected voltage $V_{DE}$ of the node between the first resistor R1 and the second resistor R2.

If $V_{DE}>V_{REF1}$, the first comparator OP1 outputs a high voltage signal to the first selecting pin CS1 of the charging control unit 12 and the trigger pin S of the trigger U, and the output pin D of the trigger U outputs a first signal from the second input pin Q of the trigger U to the second selecting pin CS2 of the charging control unit 12. If $V_{DE}<V_{REF1}$, the first comparator OP1 outputs a low voltage signal to the first selecting pin CS1 of the charging control unit 12 and the triggering pin S of the trigger U, and the output pin D of the trigger U outputs a second signal from the first input pin Q' of the trigger U to the second selecting pin CS2 of the charging control unit 12.

When the triggering pin S of the trigger U is at a high voltage status, and $V_{DE}>V_{REF3}$, which means the charge voltage $V_{BA}$ of the rechargeable battery 20 is about 48 V, the third comparator OP3 outputs a high voltage signal. Therefore, the second selecting pin CS2 of the charging control unit 12 is at a high voltage status. When the triggering pin S of the trigger U is at a high voltage status, and $V_{DE}<V_{REF3}$, which means the charge voltage $V_{BA}$ of the rechargeable battery 20 is about 36 V, the third comparator OP3 outputs a low voltage signal. Therefore, the second selecting pin CS2 of the charging control unit 12 is at a low voltage status.

When the triggering pin S of the trigger U is at a low voltage status, and $V_{DE}>V_{REF2}$, which means the charge voltage $V_{BA}$ of the rechargeable battery 20 is about 24 V, the second comparator OP2 outputs a high voltage signal. Therefore, the second selecting pin CS2 of the charging control unit 12 is at a high voltage status. When the triggering pin S of the trigger U is at a low voltage status, and $V_{DE}<V_{REF2}$, which means the charge voltage $V_{BA}$ of the rechargeable battery 20 is about 12 V, the second comparator OP2 outputs a low voltage signal. Therefore, the second selecting pin CS2 of the charging control unit 12 is at a low voltage status.

The first selecting pin CS1 and the second selecting pin CS2 of the charging control unit 12 and the charge voltage $V_{BA}$ of the rechargeable battery 20 may satisfy the following relationships.

|                          | CS1 at high voltage status | CS1 at low voltage status |
|--------------------------|----------------------------|---------------------------|
| CS2 at high voltage status | $V_{BA}$ = 48 V            | $V_{BA}$ = 24 V           |
| CS2 at low voltage status  | $V_{BA}$ = 36 V            | $V_{BA}$ = 12 V           |

The charging control unit 12 determines the charge voltage $V_{BA}$ of the rechargeable battery 20 according to the above table, and then set a corresponding charging mode to output a corresponding charge voltage corresponding the charge voltage $V_{BA}$ of the rechargeable battery 20. After the corresponding charging mode is set, the charging control unit 12 outputs a charge control signal, such as a 5 V low voltage signal, via the charging control pin CO to turn on the FET Q1, therefore the rechargeable battery 20 can be charged by the charging control unit 12 via the charge pin CH of the charging control unit 12.

The solar energy controller 10 can automatically detect the charge voltage $V_{BA}$ of the rechargeable battery 20 and then output a corresponding charge voltage to charge the rechargeable battery 20, which is very convenient.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A solar energy controller for charging a rechargeable battery, the solar energy controller comprising:
   a charging control unit, operable to output a plurality of charge voltages;
   a switch control unit connected between the charging control unit and the rechargeable battery, to receive a break control signal from the charging control unit to disable charging between the rechargeable battery and the charging control unit, the switch control unit also to receive a charging control signal from the charging control unit to enable a connection between the rechargeable battery and the charging control unit, wherein the switch control unit also receives a voltage detecting signal from the charging control unit to output a detect voltage corresponding to a charge voltage of the rechargeable battery; and
   a comparing unit, to receive the detect voltage in response to the switch control unit receiving the break control signal, and correspondingly output at least one selecting signal to the charging control unit;
   wherein the charging control unit determines the charge voltage of the rechargeable battery according to the at least one selecting signal, and outputs a corresponding one of the plurality of charge voltages to charge the rechargeable battery in response to the switch control unit receiving the charging control signal.

2. The solar energy controller of claim 1, wherein the switch control unit comprises a first electrical switch to receive the break control signal and the charging control signal, to switch the charging control unit to charge the rechargeable battery.

3. The solar energy controller of claim 2, wherein the switch control unit further comprises a second electrical switch to receive the voltage detecting signal to output the detect voltage via a resistor circuit.

4. The solar energy controller of claim 3, wherein the first and second electrical switches are field effect transistors (FETs).

5. The solar energy controller of claim 3, wherein the resistor circuit comprises a first resistor and a second resistor connected in series between a positive terminal and a negative terminal of the rechargeable battery via the second electrical switch, wherein the detect voltage is generated from a node between the first and second resistors.

6. The solar energy controller of claim 1, wherein the comparing unit comprises a plurality of comparators to detect the detect voltage.

7. The solar energy controller of claim 6, wherein the comparing unit further comprises a trigger, and the plurality of comparators comprises first to third comparators.

8. The solar energy controller of claim 7, wherein the first to third comparators receive the detect voltage and output comparing results to the trigger, the trigger outputs the at least one selecting signal to the charging control unit according to the comparing results.

9. The solar energy controller of claim 8, wherein the plurality of charge voltages comprises first to fourth charge voltages V1-V4, a relationship of the first to fourth charge voltages V1-V4 and first to third reference voltages $V_{REF1}$-$V_{REF3}$ respectively connected to the first to third comparators is according to the following formula: V1<[$V_{REF2}$*(R1+R2)/R2]<V2<[$V_{REF1}$*(R1+R2)/R2]<V3<[$V_{REF3}$*(R1+R2)/R2]<V4.

10. The solar energy controller of claim 9, wherein the first to fourth charge voltages V1-V4 are 12 V, 24 V, 36 V, 48 V, respectively.

11. The solar energy controller of claim 9, wherein the first to third reference voltages $V_{REF1}$-$V_{REF3}$ are 26 V*R2/(R1+R2), 14 V*R2/(R1+R2), 38 V*R2/(R1+R2), respectively.

* * * * *